(12) United States Patent
Arvidsson

(10) Patent No.: US 7,127,333 B2
(45) Date of Patent: Oct. 24, 2006

(54) REMOTE CONTROL SYSTEM FOR A VEHICLE

(75) Inventor: Lennart Arvidsson, Kållered (SE)

(73) Assignee: AB Volvo Penta, Göteborg (SE)

( * ) Notice: Subject to any disclaimer, the term of this patent is extended or adjusted under 35 U.S.C. 154(b) by 0 days.

(21) Appl. No.: 10/709,587

(22) Filed: May 15, 2004

(65) Prior Publication Data
US 2006/0206244 A1    Sep. 14, 2006

Related U.S. Application Data

(63) Continuation of application No. PCT/SE02/02042, filed on Nov. 8, 2002, now abandoned.

(30) Foreign Application Priority Data
Nov. 16, 2001    (SE) .................................... 0103812

(51) Int. Cl.
*G05B 19/18*    (2006.01)
*G05B 11/01*    (2006.01)

(52) U.S. Cl. ............................. 701/2; 701/21; 701/41; 701/42

(58) Field of Classification Search .................... 701/2, 701/21, 41, 42; 114/144 R
See application file for complete search history.

(56) References Cited

U.S. PATENT DOCUMENTS

| | | | |
|---|---|---|---|
| 3,935,645 A * | 2/1976 | Okamoto et al. | 33/363 R |
| 4,231,310 A | 11/1980 | Muramatsu | 114/144 RE |
| 4,519,335 A | 5/1985 | Krautkremer et al. | 114/144 R |
| 4,691,659 A | 9/1987 | Ito et al. | 114/144 R |
| 4,818,990 A * | 4/1989 | Fernandes | 340/870.07 |
| 5,874,942 A * | 2/1999 | Walker | 345/158 |
| 6,694,228 B1 * | 2/2004 | Rios | 701/2 |
| 6,697,715 B1 * | 2/2004 | Freeman | 701/2 |

* cited by examiner

*Primary Examiner*—Thomas G. Black
*Assistant Examiner*—Brian J. Broadhead
(74) *Attorney, Agent, or Firm*—Novak Druce & Quigg, LLP

(57) ABSTRACT

Method and arrangement for providing a remote control system for a vehicle (1) including a primary heading sensor (14) fixedly attached to the vehicle (1). The primary heading sensor (14) is adapted to detect a reference heading (N). A remote control unit (15) having a steering input manipulator (16) that is either portable by a user or rotationally attached to the vehicle (1) relative to a main axis (4) of the vehicle (1). The remote control unit (1) is adapted to communicate steering input data to a steering computer (12) that is programmed to process the steering input data into steering commands and to communicate the steering commands to a steering mechanism (9) of the vehicle (1). The remote control unit (1) has a secondary heading sensor that is synchronized with the primary heading sensor (14) with respect to the reference heading. The steering input data includes information of an active position of the steering input manipulator (16) relative to the reference heading (N) and the active position of the steering input manipulator (16) determines the desired direction of travel of the vehicle (1) regardless of the orientation of the remote control unit (15) relative to the main axis (4) of the vehicle (1).

30 Claims, 5 Drawing Sheets

REMOTE CONTROL SYSTEM FOR A VEHICLE

CROSS-REFERENCE TO RELATED APPLICATIONS

The present application is a continuation patent application of International Application No. PCT/SE02/02042 filed 8 Nov. 2002 which was published in English pursuant to Article 21(2) of the Patent Cooperation Treaty, and which claims priority to Swedish Application No. 0103812-4 filed 16 Nov. 2001. Both applications are expressly incorporated herein by reference in their entireties.

TECHNICAL FIELD

The present invention relates to a remote control system for a vehicle, and in particular to a remote control system for a water-going craft having multiple independently steerable propulsion drives, such as rotatable thruster assemblies.

BACKGROUND ART

Remote controls for vehicles are well established and are currently used for controlling a wide span of vehicles ranging from simple radio-controlled toys to larger vehicles such as trucks, boats and unmanned reconnaissance aircraft.

A remote control unit normally communicates wirelessly with the vehicle, for example by means of radio transmissions or other suitable means such as infra red light. Alternatively, the remote control unit communicates with the vehicle by means of a communication wire.

In the marine sector, the use of multiple independently steerable propulsion drives now extends not only to larger ships, offshore platforms and the like, but also to yachts and smaller boats where an increased maneuverability compared to conventional fixed-drive/rudder combinations or conventional stern drives is desirable. The coordination of steering and thrust of the independently steerable propulsion drives in order to execute a desired maneuver is generally managed by an onboard steering computer. Here, the use of a remote control system for communicating with the steering computer allows the user or helmsman to move about freely aboard the boat into optimum vantage positions for various maneuvers. For example, the user or helmsman may conveniently stand near the stern or bow of the boat—whichever the case may be-in order to gently maneuver the boat alongside a dock or jetty while maintaining a close overview of boat movement.

A well known problem with current remote control systems, however, is that the relative orientation of the controls only coincides with the "normal" orientation of the fixed primary controls of the boat as long as the remote control unit is aligned with the stern-to-bow direction of the boat. As soon as this is no longer the case, the user or helmsman has to mentally convert (translate) the desired direction of travel into correct steering commands to the remote control. If, for example, the user or helmsman is facing backwards towards the stern of the boat, the correct steering commands to enter into the remote control unit becomes a mirror image of the normal commands to which the user or helmsman is accustomed. This problem is common to known remote controls of the above-described type and is often a contributing cause of maneuvering errors, especially in the case of inexperienced users.

DISCLOSURE OF INVENTION

The above mentioned problem is solved by a remote control system for a vehicle, comprising (including, but not limited to) a primary heading sensor fixedly attached to the vehicle. This primary heading sensor is adapted to detect a reference heading. A remote control unit having a steering input manipulator is provided and is either portable by a user or rotationally attached to the vehicle relative to a main axis of the vehicle. The remote control unit is adapted to communicate steering input data to a steering computer programmed to process the steering input data into steering commands and to communicate the steering commands to a steering mechanism of the vehicle. The remote control unit comprises a secondary heading sensor which is synchronized with the primary heading sensor with respect to the reference heading. The steering input data includes information of an active position of the steering input manipulator relative to the reference heading, and the active position of the steering input manipulator determines the desired direction of travel of the vehicle regardless of the orientation of the remote control unit relative to the main axis of the vehicle.

In one embodiment of the invention, the primary and secondary heading sensors each comprises a compass and the reference heading corresponds to, or is otherwise related to magnetic north.

In a suitable embodiment, the secondary heading sensor comprises a flux gate compass and the steering input manipulator includes a joystick. The steering input data then includes a projected angle between the reference heading and the inclination direction of the joystick.

In at least one embodiment, the steering input data further includes a desired relative thrust value defined by the degree of inclination from a vertical reference position of the joystick.

Advantageously, the secondary heading sensor is continuously synchronized with the primary heading sensor and the remote control unit is adapted for wireless communication with the steering computer.

In a preferred embodiment of the invention, the vehicle is a water-going craft having multiple independently steerable propulsion drives. The steering commands from the steering computer then comprises individually computed thrust and steering angle values for each propulsion drive which are needed to move the craft in the desired direction of travel as indicated by the steering input manipulator.

The water-going craft further suitably comprises a bow thruster assembly oriented substantially transversally to the main axis, the bow thruster assembly being directly or indirectly linked to the steering computer.

In a well suited embodiment, the water-going craft also comprises one or more rudders, the rudders being directly or indirectly linked to the steering computer.

In an alternative embodiment, the steering input manipulator includes a substantially spherical tracking-ball. The steering input data then includes an angle between the reference heading and the direction of rotation of the tracking-ball. In one related embodiment, the steering input data further includes a desired relative thrust value defined by the degree of rotation from a central reference position of the tracking-ball.

The remote control system according to the invention thus offers a substantial improvement over known systems in that it will cause the vehicle to move in the direction the steering input manipulator is pointing or otherwise set regardless of the orientation of the remote control unit relative to the main axis of the vehicle. This ensures safe and efficient maneuvering capabilities and eliminates the well known problem of having to mentally convert the desired direction of travel into correct steering commands when the remote control unit is not aligned with the stern-to-bow direction (i.e. the main axis) of the boat.

BRIEF DESCRIPTION OF THE DRAWINGS

The invention will now be described in greater detail, by way of example only, with reference to the attached drawings in which like reference numerals have been used to indicate like structures, and in which.

MODE FOR THE INVENTION

Figure 1:
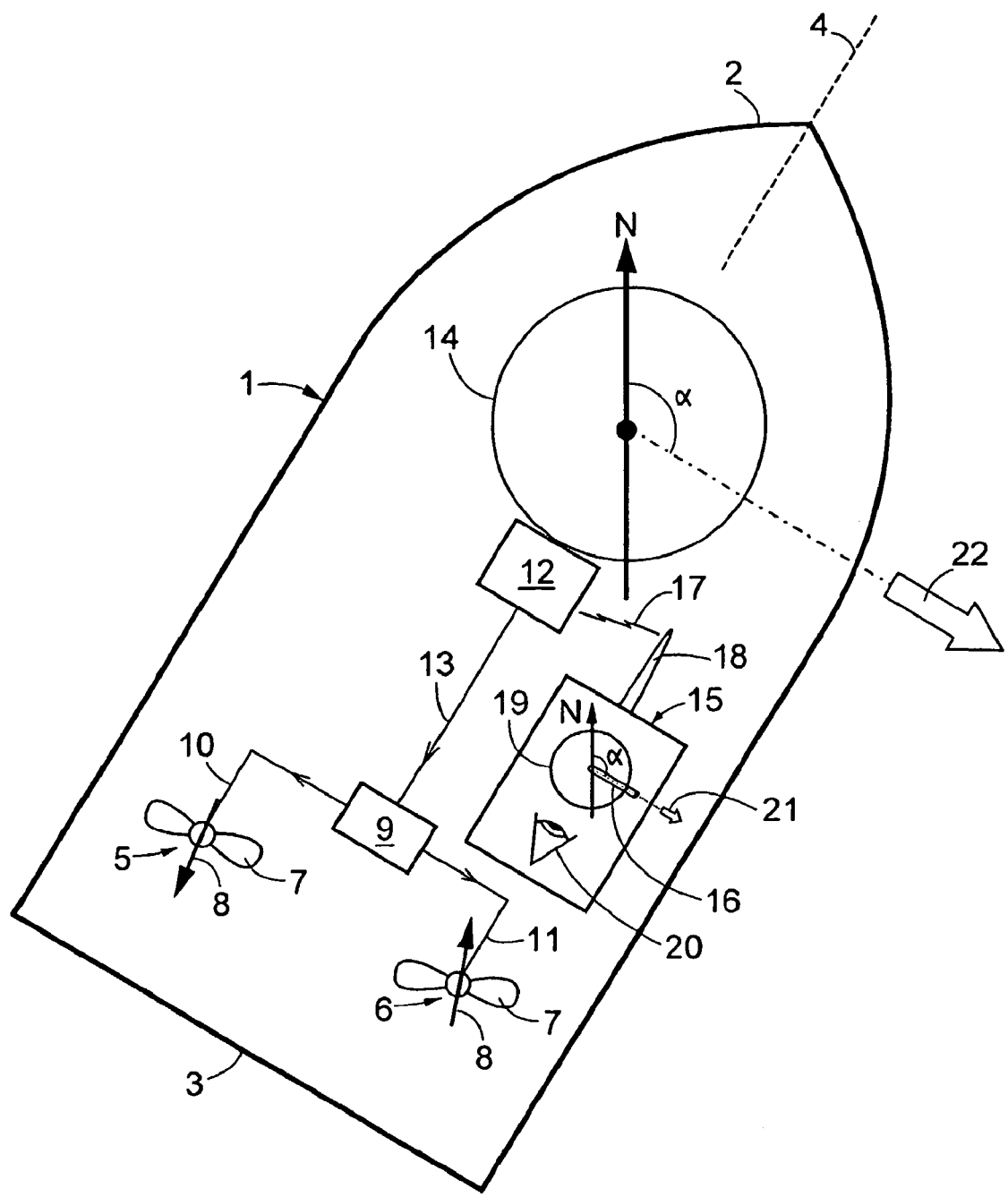
FIG. 1 is a schematic representation of a remote control system configured according to the teachings of the present invention as applied in a boat equipped with twin independently steerable propulsion drives and in which the remote control unit is aligned with the stern-to-bow direction of the boat.

In FIG. 1, an exemplary embodiment of a remote control system is illustrated that is configured according to the teachings of the present invention, and which is shown schematically for the sake of clarity. Reference numeral 1 denotes a vehicle in the form of a boat having a pointed bow 2 and a flat stern 3. The main axis of the boat is defined as a line of symmetry extending from the stern 3 to the bow 2, the main axis being denoted by a shortened dashed line with reference numeral 4 in the bow 2 of the boat 1.

The boat 1 is equipped with twin independently steerable propulsion drives 5, 6, each schematically represented by a propeller 7 and an arrow 8 indicating a primary direction of thrust. Each propulsion drive 5, 6 may be fully or partially rotatable about a substantially vertical axes (not shown) in a known manner.

Furthermore, the propellers 7 may be of either a pushing design or a pulling design. For slower boats, for example tugs, the propulsion drives 5, 6 may consist of fully rotatable, so called tunnel thruster assemblies (not shown) utilized for added thrust effect at slow speed. The engines driving the propulsion drives 5, 6 are not shown in the figures, but may consist of any appropriate marine type engine, depending on the operational specification demands on the boat 1.

The propulsion drives 5, 6 in the illustrated example are communicating with a steering mechanism 9 via mechanical, electrical or wireless links 10, 11. The steering mechanism 9 is further adapted to receive steering commands from an onboard steering computer 12 via a communication link 13. The steering commands also include information of desired general thrust effect level. The steering computer 12 manages the coordination of steering and thrust of the independently steerable propulsion drives 5, 6 in order to execute a desired maneuver.

As shown in FIG. 1, the remote control system comprises a primary heading sensor 14 fixedly attached to the boat 1, the primary heading sensor 14 being adapted to detect a reference heading indicated in the figures with an arrow marked with the letter "N". The primary heading sensor 14 communicates with the onboard steering computer 12. In one embodiment of the invention, the primary heading sensor 14 is also the main navigational compass of the boat 1, and the reference heading corresponds to, or is otherwise related to magnetic north, as indicated by the arrow marked with the letter "N".

As such, the primary heading sensor or compass 14 may be of varying design depending on the size and operational use of the boat 1. Hence, larger yachts and ships are normally equipped with a gyroscopic compass, while smaller boats 1 are normally equipped with less expensive and more conventional magnetic compasses.

The remote control system further includes a remote control unit 15 which is either portable by a user as illustrated, or is rotationally attached to the boat 1 relative to the main axis 4 of the boat 1. The latter embodiment may for example be applied on the bridge wings (not shown) of larger yachts or ships where remote control units 14 may be rotationally attached to a fixed stand or pillar (not shown) on the bridge wings as a complement to the main controls (not shown) of the yacht or ship.

The remote control unit 15 is provided with a steering input manipulator 16, which in the embodiment shown in FIGS. 1–4 takes the form of a joystick. By means of the steering input manipulator 16, the remote control unit 15 is adapted for wireless communication of steering input data to the onboard steering computer 12. In the shown example, the wireless communication is transmitted via radio transmissions indicated by the schematically drawn jagged line 17 emanating from a radio antenna 18 on the remote control unit 15 (transmitter and receiver not shown).

One feature of the invention is that the remote control unit 15 further comprises a secondary heading sensor 19 which is represented by a small circle in FIG. 1 and that is synchronized with the primary heading sensor 14 with respect to the reference heading "N". The steering input data hereby includes information of an active position of the steering input manipulator 16 relative to the reference heading "N", whereby the active position of the steering input manipulator 16 determines the desired direction of travel of the boat 1 regardless of the orientation of the remote control unit 15 relative to the main axis 4 of the boat 1.

In FIG. 1, the remote control unit 15 is oriented in the direction of the main axis 4 of the boat 1, and thus in the same way as the fixedly mounted main controls (not shown) of the boat 1. The viewing direction of the helmsman is in the same direction, as indicated with a schematic eye symbol 20 on the remote control unit 15. Since the reference heading N denotes the magnetic north in the illustrated example, the boat 1 is oriented in a north-easterly direction; that is, upwardly and to the right on the drawing sheet. Suppose the helmsman then wants to move the boat 1 in a south-easterly direction, and thus moves the joystick 16 in the desired direction of travel as indicated by the small hollow arrow 21. The remote control unit 15 then sends steering input data to the steering computer 12, including a projected angle [A] between the reference heading N and the inclination direction of the joystick (i.e. the desired direction of travel, as indicated by the small hollow arrow 21 in FIGS. 1–3).

The steering computer 12 processes the steering input data into steering commands, which are sent to the steering mechanism 9. The steering commands comprise individually computed thrust and steering angle values for each propulsion drive 5, 6 which are needed to move the boat 1 in the desired direction of travel 21 as indicated by the joystick 16. In consequence, the boat 1 moves in an actual direction of travel indicated by the large hollow arrow 22. Since the secondary heading sensor 19 is continuously synchronized with the primary heading sensor 14, the actual direction of travel 22 is made to come into coincidence with the indicated and desired direction of travel 21. In this case where the remote control unit 15 is oriented in the direction of the main axis 4 of the boat 1, the steering operation will appear to the helmsman like a fully normal operation as performed with the main, fixed controls (not shown) of the boat 1.

Figure 2:
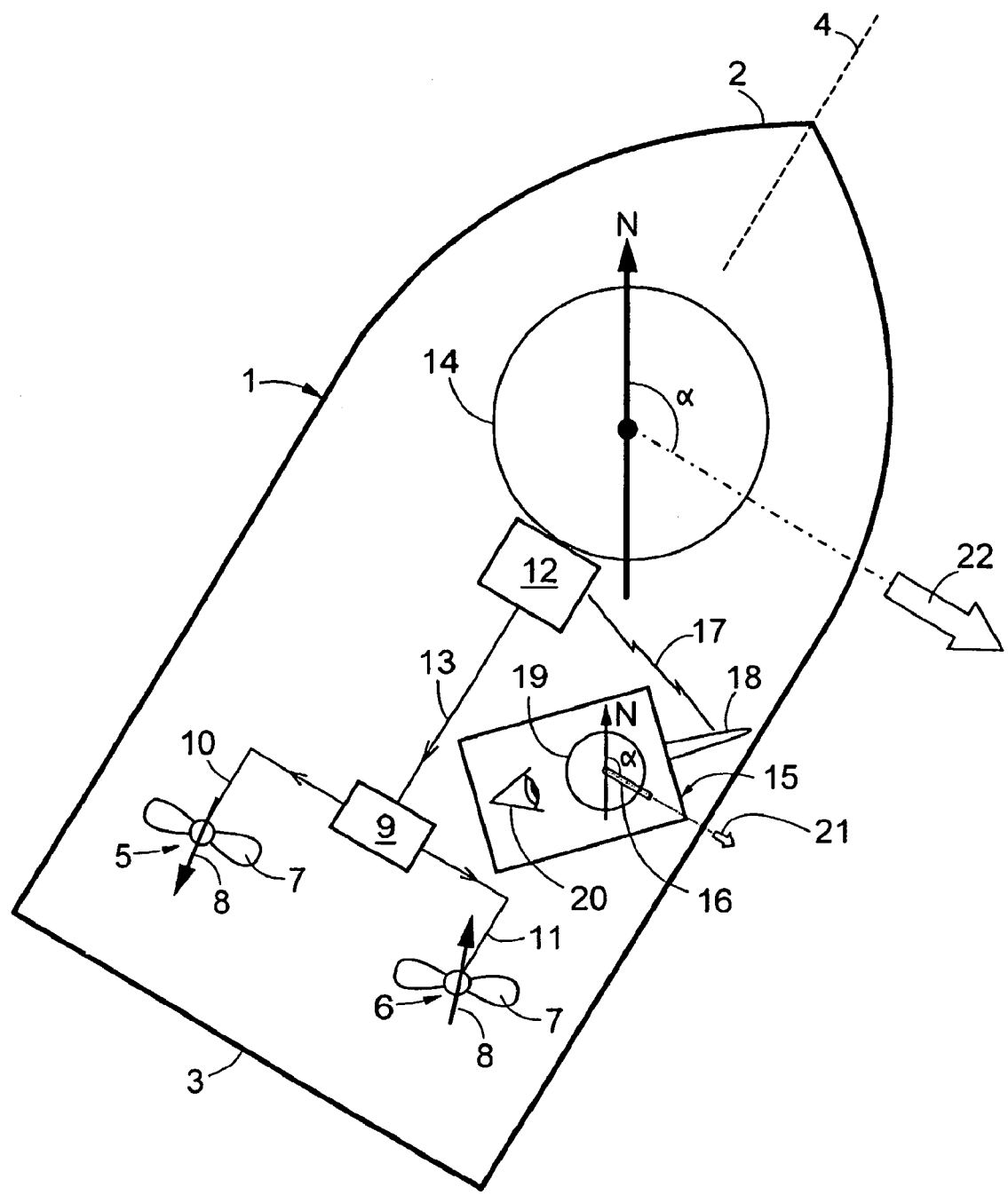
FIG. 2 is a schematic representation similar to the one shown in FIG. 1 except that the remote control unit is not in alignment with the stern-to-bow direction of the boat.

FIG. 2 is very similar to FIG. 1, except for the orientation of the remote control unit 15 now being altered so that the unit 15 is no longer aligned with the main axis 4 of the boat 1. The viewing direction 20 of the helmsman is in the same general direction as the remote control unit 15 is pointing at. In order to perform a maneuver identical to that shown in FIG. 1, the helmsman again simply moves the joystick 16 in the desired direction of travel 21 and the boat 1 will travel in the same actual direction of travel 22 as in the previous example of FIG. 1; that is, coinciding with the desired direction of travel 21. Thus, according to the invention, the helmsman is no longer forced to mentally translate or recalculate the correct movement of the joystick relative to the orientation of the remote control unit as is the case with conventional remote control systems. Instead, the boat 1 will simply steer in the direction in which the joystick is pointing, regardless of the orientation of the remote control unit 15 relative to the main axis 4 of the boat 1. This substantially facilitates the maneuvering of the boat.

Figure 3:
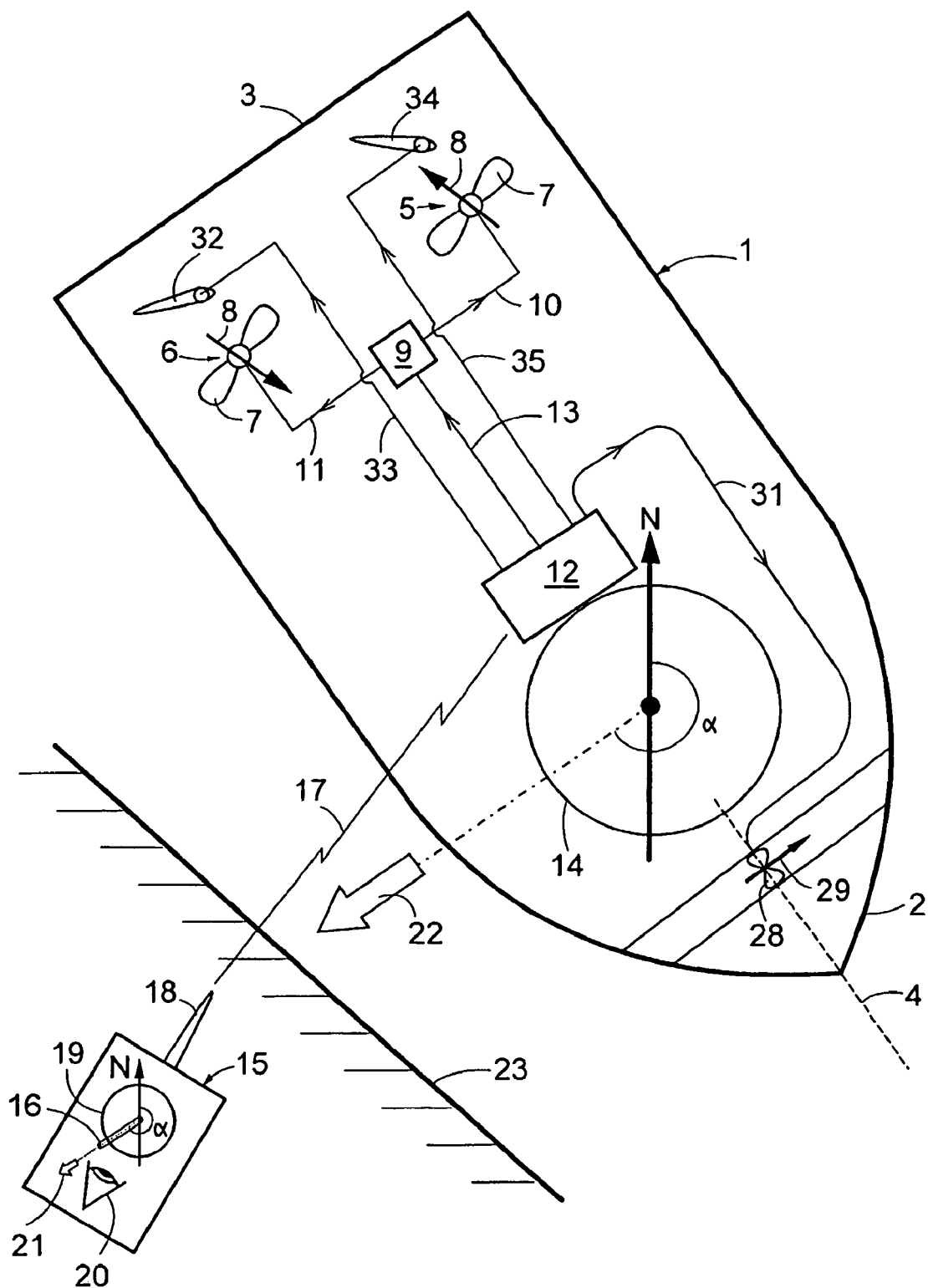
FIG. 3 is a schematic representation of a boat provided with rudders and a bow thruster assembly being maneuvered alongside a jetty, the remote control unit being manipulated by a user who is standing on the jetty.

In FIG. 3, a docking situation is shown in which the helmsman is standing ashore on a dock or jetty 23 with the remote control unit 15 while maneuvering the boat 1 towards him and alongside the jetty 23. Again, the helmsman simply points the joystick in the desired direction of travel 21 resulting in the boat 1 moving in an identical actual direction of travel 22 towards the jetty 23. In this way the helmsman is able to gently pilot the boat 1 alongside the jetty 23 by intuitively performing highly precise maneuvers.

In the embodiment shown in FIG. 3, the boat 1 is further provided with a bow thruster assembly 28, a starboard rudder 32 and a port rudder 34. The bow thruster assembly 28 is oriented substantially transversally to the main axis 4 and is directly linked to the steering computer 12 via a communication link 31. In an alternative which has not been illustrated, the bow thruster assembly 28 may be indirectly linked to the steering computer 12 via, for example, the steering mechanism 9.

With further reference to FIG. 3, the starboard rudder 32 and the port rudder 34 are directly linked to the steering computer 12 via communication links 33 and 35, respectively. Here, though not shown, the rudders 32 and 34 may be indirectly linked to the steering computer 12 via, for example, the steering mechanism 9.

Figure 4:
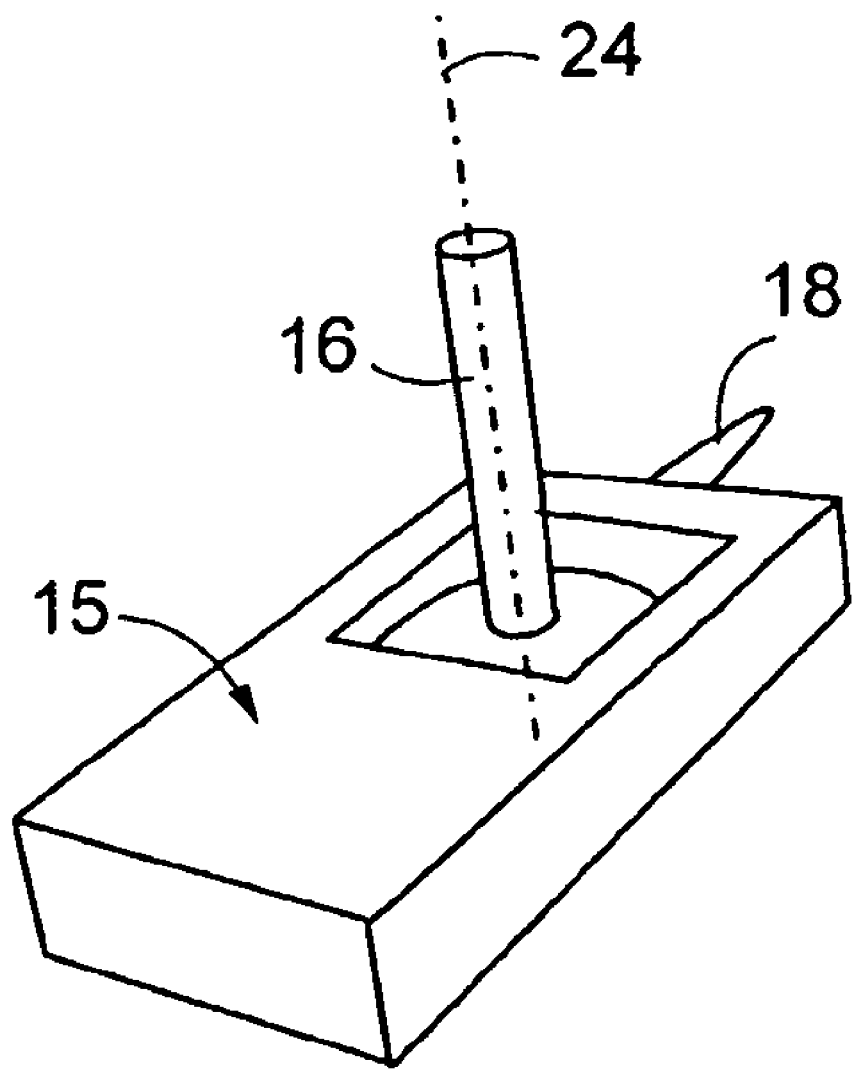
FIG. 4 is a simplified perspective image of a remote control unit having a steering input manipulator in the form of a joystick.

FIG. 4 shows a simplified perspective image of a remote control unit 15 having a steering input manipulator 16 in the form of a joystick. In a suitable embodiment of the invention, the steering input data includes a desired relative thrust value defined by the degree of inclination from a vertical reference position of the joystick 16. The vertical reference position is indicated in the figure by the vertical centerline with reference numeral 24.

Figure 5:
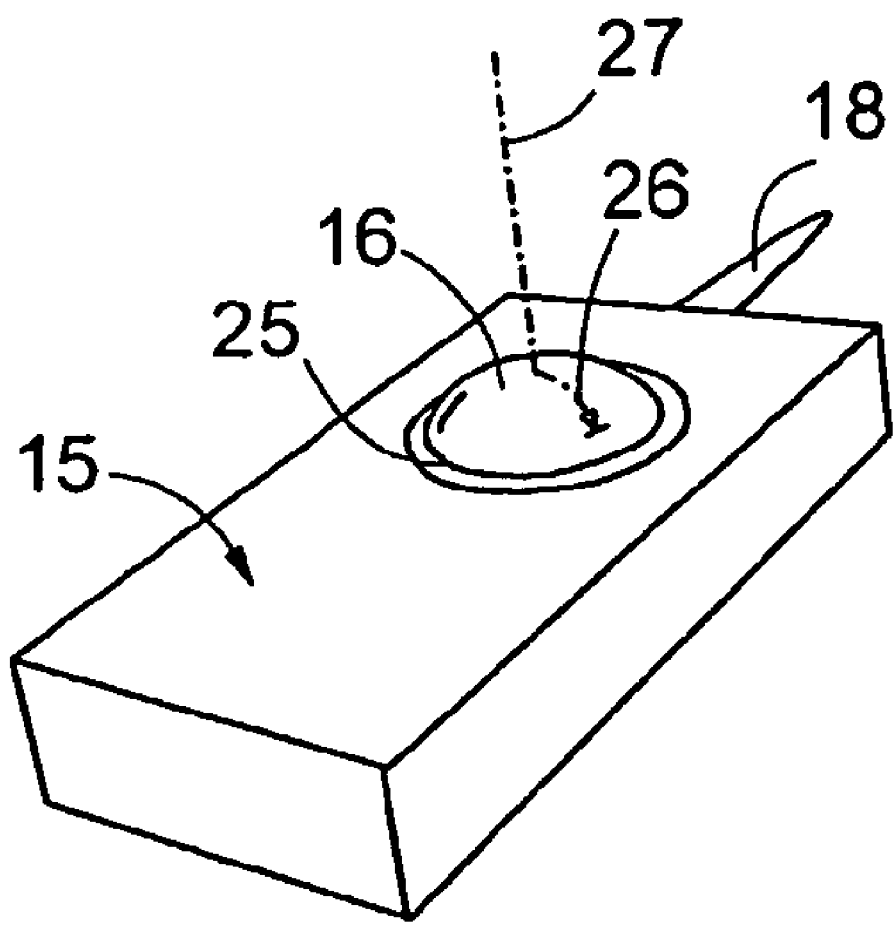
FIG. 5 is a simplified perspective image of a remote control unit having a steering input manipulator in the form of a tracking-ball.

FIG. 5 shows a simplified perspective image of a remote control unit 15 having a steering input manipulator 16 in the form of a spherical, so-called tracking-ball. The tracking ball 16 is rotatably suspended in an opening 25 in the remote control unit 15. In this embodiment, the steering input data includes an angularity detector (not shown in the figure, but defined in analogy with the previously described angle a) between the reference heading and the direction of rotation the tracking-ball 16. An exemplary direction of rotation is indicated by the dash-dotted line 26 in FIG. 5. Advantageously, the steering input data further includes a desired relative thrust value defined by the degree of rotation from a central reference position of the tracking-ball 16. In FIG. 5, the central reference position is indicated by the vertical centerline 27.

The secondary heading sensor 19 in the remote control unit 15 is suitably a so-called flux gate compass. A general description of such a compass design is given below, without direct reference to any of the drawing figures: thus, a flux gate compass is a device in which the balance of currents in coil windings is affected by the earth's magnetic field. The flux gate compass has two small coils wound on ferrite cores at right-angles to each other. Both are energized in phase at a low frequency usually between 400–1000 Hz. The earth's magnetic field produces a small phase-shift which depends on the angle of the field relative to the coil. If the field is directly aligned with one coil and therefore directly across the other coil, the coil it is aligned with experiences maximum phase-shift and the other none at all. A small electronic circuit detects the difference and indicates it digitally. Most modern auto-pilot systems rely primarily on the flux gate compass because the response time is substantially shorter than that of a traditional magnetic compass. A flux gate compass is relatively inexpensive, generally very accurate and does not suffer from the problems a mechanical magnetic compass has with vibration and rapid turns.

The primary heading sensor 14 may, as mentioned before, include a gyroscopic compass. In a gyroscopic compass, the axis of a spinning mass tends to remain pointed in a constant direction. This direction does not necessarily have to be north/south related since a gyroscopic compass is not north seeking on its own and is typically calibrated with a conventional or flux gate compass. Thus in an alternative embodiment, both the primary and the secondary heading sensors 14, 19 may include gyroscopic compasses. In such an embodiment, it is possible to use a predetermined reference heading which is not related to the magnetic north. As general background, a gyroscopic compass comprises a motor and a heavy disk mounted in a set of gimbals. Sensors on pivots of the gimbals—or otherwise mounted in the housing of the gyro—detect the relative movement between the axis of the gyro and the housing of the gyro.

In an embodiment where one or both of the heading sensors 14, 19 include conventional magnetic compasses, the remote control system will function regardless of the local deviation from true north, since both heading sensors 14, 19 are synchronized with each other with respect to any set reference heading N.

It is to be understood that the invention is by no means limited to the embodiments described above, and may be varied freely within the scope of the patent claims. For example, the remote control unit 15 may alternatively be communicating with the steering computer 12 via a cable (not shown). Further, in yet a further embodiment, the boat 1 may be equipped with more than two propulsion drives 5, 6. However, the principle of the invention is also applicable to a boat with a single propulsion drive (not shown). Finally, it should be noted that the remote control system in its broadest sense is applicable to any type of vehicle operating on land, at sea or in the air.

The invention claimed is:

1. A remote control system for a vehicle (1), comprising:
a primary heading sensor attached to the vehicle; and
a remote control unit comprising a steering input manipulator and a secondary heading sensor, said remote control unit being one of (1) portable by a user and (2) rotationally attached to the vehicle relative to a main axis of the vehicle, said remote control unit outputting steering input data to a steering computer that is programmed to process the steering input data into steering commands and to communicate the steering commands to a steering mechanism of the vehicle, wherein said remote control unit outputs heading information to the steering computer for synchronization with said primary heading sensor and whereby said computer uses the information for determining a desired direction of travel of the vehicle regardless of the orientation of the remote control unit relative to the main axis of the vehicle.

2. The remote control system as recited in claim 1, wherein said primary and secondary heading sensors each comprises a compass and said reference heading is correlated with magnetic north.

3. The remote control system as recited in claim 2, wherein said secondary heading sensor comprises a flux gate compass.

4. The remote control system as recited in claim 1, wherein said steering input manipulator comprises a joystick.

5. The remote control system as recited in claim 4, wherein said steering input data includes a projected angle between the reference heading and an inclination direction of the joystick.

6. The remote control system as recited in claim 5, wherein said steering input data further includes a desired relative thrust value defined by the degree of inclination from a vertical reference position of the joystick.

7. The remote control system as recited in claim 1, wherein information from said secondary heading sensor is continuously compared with information from the primary heading sensor.

8. The remote control system as recited in claim 1, wherein said remote control unit is adapted for wireless communication with the steering computer.

9. The remote control system as recited in claim 1, wherein said vehicle is a water-going craft comprising multiple independently steerable propulsion drives.

10. The remote control system as recited in claim 9, wherein said steering commands from the steering computer comprises individually computed thrust and steering angle values for each propulsion drive needed to move the craft in the desired direction of travel as indicated by the steering input manipulator.

11. The remote control system as recited in claim 9, wherein said water-going craft further comprises a bow thruster assembly oriented substantially transversally to the main axis, said bow thruster assembly being directly or indirectly linked to the steering computer.

12. The remote control system as recited in claim 9, wherein said water-going craft further comprises one or more rudders, said rudders being directly linked to the steering computer (12).

13. The remote control system as recited in claim 9, wherein said water-going craft further comprises one or more rudders, said rudders being indirectly linked to the steering computer (12).

14. The remote control system as recited in claim 1, wherein said steering input manipulator includes a substantially spherical tracking-ball.

15. The remote control system as recited in claim 14, wherein said steering input data includes an angle (P) between the reference heading and the direction of rotation of the tracking-ball.

16. The remote control system as recited in claim 15, wherein said steering input data further comprises a desired relative thrust value defined by the degree of rotation from a central reference position of the tracking-ball.

17. A method for remotely controlling a watercraft, said method comprising:
inputting an operator control command indicative of a desired direction of movement into a remote control device;
comparing orientation of the remote control device to an environmental reference at the time of input of the operator control command;
determining an orientation of the watercraft relative to the environmental reference at the time of input of the operator control command; and
comparing the orientation of the remote control device with the orientation of the watercraft, and based on said comparison, controlling movement of the watercraft in the operator input desired direction.

18. The method as recited in claim 17, wherein said environmentally based reference system is a relative correlation to magnetic north.

19. The method as recited in claim 17, wherein operator manipulation of said remote control device indicates a desired direction of travel and a desired degree of thrust to be imposed on said vehicle in said desired direction.

20. The method as recited in claim 19, wherein said remote control device has one of an operator manipulable (1) joy-stick input and (2) a roller-ball input.

21. A vehicle remote control system having a main axis (1), comprising:
a primary heading sensor attached to the vehicle that generates a primary reference heading;
a remote control steering manipulator comprising a secondary heading sensor and a steering input and that generates a user desired direction of travel heading; and
a steering computer that receives the primary reference heading from the primary heading sensor and the user desired direction of travel heading from the remote control steering manipulator, wherein the computer compares the primary reference heading and the desired direction of travel heading, thereby determining a desired heading regardless of the orientation of the remote control steering manipulator with respect to the vehicle main axis.

22. The remote control system of claim 21, wherein each said heading sensor comprises a compass and the reference heading comprises information with respect to magnetic north.

23. The remote control system of claim 22, wherein the secondary heading sensor comprises a flux gate compass.

24. The remote control system of claim 21, wherein the steering input comprises a joystick.

25. The remote control system of claim 21, further comprising a steering computer that controls a steering mechanism of the vehicle.

26. The remote control system of claim 25, wherein the vehicle is a watercraft and the computer controls the watercraft heading.

27. A method for remote controlling a vehicle heading, comprising:

generating a vehicle primary heading from a heading sensor fixed to the vehicle;

generating a remote control secondary heading from a heading sensor in a remote control;

generating user steering input information from the remote control; and comparing the secondary heading and user steering input information with the primary heading to control the vehicle heading in response to the user input while correcting for changes between the primary heading and the secondary heading.

28. The method of claim 27, wherein the heading sensor fixed to the vehicle is a sensor that senses the earth's magnetic field.

29. The method of claim 27, wherein the vehicle is a watercraft and the remote control is portable.

30. The method of claim 27, wherein information from the steering input signal and secondary heading are sent via radio signals to a computer that synchronizes the secondary heading with the primary heading.

* * * * *